(12) United States Patent
Bruce

(10) Patent No.: US 10,861,209 B1
(45) Date of Patent: Dec. 8, 2020

(54) UNMANNED AERIAL MONITORING VEHICLE

(71) Applicant: Michael Bruce, Vista, CA (US)

(72) Inventor: Michael Bruce, Vista, CA (US)

( * ) Notice: Subject to any disclaimer, the term of this patent is extended or adjusted under 35 U.S.C. 154(b) by 236 days.

(21) Appl. No.: 16/184,250

(22) Filed: Nov. 8, 2018

(51) Int. Cl.
| | |
|---|---|
| *G06T 13/20* | (2011.01) |
| *G05D 1/10* | (2006.01) |
| *G05D 1/00* | (2006.01) |
| *B64C 39/02* | (2006.01) |
| *B64D 45/00* | (2006.01) |
| *B60L 53/31* | (2019.01) |

(52) U.S. Cl.
CPC .............. *G06T 13/20* (2013.01); *B60L 53/31* (2019.02); *B64C 39/024* (2013.01); *B64D 45/00* (2013.01); *G05D 1/0038* (2013.01); *G05D 1/0044* (2013.01); *G05D 1/0094* (2013.01); *G05D 1/101* (2013.01); *B60L 2200/10* (2013.01); *B64C 2201/027* (2013.01); *B64C 2201/127* (2013.01)

(58) Field of Classification Search
CPC ...... G06T 13/20; B60L 53/31; B60L 2200/10; G05D 1/0094; G05D 1/101; G05D 1/0044; G05D 1/0038; B64C 39/024; B64C 2201/027; B64C 2201/127; B64D 45/00
USPC .......................................................... 701/2
See application file for complete search history.

(56) References Cited

U.S. PATENT DOCUMENTS

| | | | |
|---|---|---|---|
| 183,498 A | 10/1876 | Hay | |
| 6,057,879 A | 5/2000 | Weber | |
| 2017/0132936 A1* | 5/2017 | Dorsch | .................... G08G 3/00 |
| 2019/0072392 A1* | 3/2019 | Haspel | .................. G01C 21/00 |

FOREIGN PATENT DOCUMENTS

KR            20180019534      *   2/2018

* cited by examiner

*Primary Examiner* — Muhammed Shafi
(74) *Attorney, Agent, or Firm* — Sanchelima & Associates, P.A.; Christian Sanchelima; Jesus Sanchelima

(57) ABSTRACT

The present invention is an unmanned aerial vehicle (UAV) monitoring system, comprising a UAV that monitors a surface of a water body while hovering over water body. UAV comprises an image sensor that captures a field-of-view (FOV) when one or more events are identified from a surface of water body and a first transceiver that transmits an encoded captured FOV. UAV monitoring system further comprises a base unit located at an elevated point in a water vehicle and configured to dock UAV. Base unit comprises a second transceiver that receives encoded FOV from first transceiver, a decoder that decodes received encoded FOV, a graphics processing unit that generates a three-dimensional rendering and virtual graphic animation based on decoded FOV, and a ground control unit that communicates generated three-dimensional rendering and virtual graphic animation to one or more display devices coupled to base unit.

11 Claims, 5 Drawing Sheets

UNMANNED AERIAL MONITORING VEHICLE

BACKGROUND OF THE INVENTION

1. Field of Said Invention

The present disclosure relates to an unmanned aerial monitoring vehicle (UAV). more particularly, said present disclosure relates to UAV deployable in marine and terrestrial applications.

2. Description of Said Related Art

Many kinds of fishing vessels, such as a boat, a ship, or a yatch, are used in commercial, artisanal, and recreational fishing to catch fish in the sea, a lake, or a river. Generally, such fishing vessels have tuna towers that are installed to provide an extra elevation required to spot fish, birds, floating debris, and other marine objects. Tuna Towers generally have lightweight fiberglass hard tops, standing platforms, and a bimini. However, installation of such tuna towers may be quite expensive. Further, such tuna towers require continuous presence of an individual, such as sailor or fisherman, to monitor the water surface, which may be very tedious.

Several designs for such monitoring have been presented in the past. None of them, however, presents a convenient, user-friendly, and interactive means for monitoring the water surface.

Applicant believes that a related reference corresponds to U.S. Pat. No. 6,057,879 filed by Eric D Weber that discloses a fishing surveillance device. The disclosed device comprises a submersible camera releasably attached to a fishing line so that the submersible camera can observe the bait receiving end of the fishing line when the submersible camera and the bait receiving end of the fishing line are submerged in a body of water. The submersible camera is connected to a video monitor via video cable. However, such fishing surveillance device is operable in a very short range and limited environment, thus not useful for users, for example fishermen, carrying out commercial fishing.

Applicant further believes that another related reference corresponds to US publication number 20150183498A1 filed by Patrick Wardle that discloses a personal submersible drone. The autonomous submersible aquatic drone comprises a shaped housing, a propulsion system, one or more electromotors, a camera, a sonar unit, a wireless transponder, a battery, a microcontroller unit, and a control hardware unit. However, submersible drones are very expensive and limited to aquatic exploration under the water surface only.

Other documents describing the closest subject matter provide for a number of more or less complicated features that fail to solve the problem in an efficient and economical way. None of these patents suggest the novel features of the present invention.

SUMMARY OF THE INVENTION

It is an object of present invention to describe a UAV monitoring system, comprising a UAV configured to monitor a surface of a water body while hovering over water body. UAV may comprise an image sensor configured to capture a field-of-view (FOV) when one or more events are identified from a surface of water body and a first transceiver configured to transmit an encoded captured FOV. FOV may be a live feed or one or more still photographs. One or more events may correspond to presence of marine animals, presence of marine plants, or an environmental occurrence, wherein environmental occurrence corresponds to a temperature break, color change, a waypoint, or an atmospheric condition.

Base unit may be located at an elevated point in a water vehicle and configured to dock UAV. Base unit may comprise a second transceiver configured to receive encoded FOV from first transceiver, a decoder configured to decode received encoded FOV, a graphics processing unit configured to generate a three-dimensional rendering and virtual graphic animation based on decoded FOV, and a ground control unit configured to communicate generated three-dimensional rendering and virtual graphic animation to one or more display devices coupled to base unit. One or more display devices may be associated with one or more users, wherein one or more users view three-dimensional rendering and virtual graphic animation for monitoring water surface, fishing aid, marine navigation and survey applications, and boating safety, wherein each of one or more display devices corresponds to a smart phone, a tablet, or a dedicated monitor. In an embodiment, UAV may include navigational lights comprising red light and green light. Red light may be on port side that is left side of UAV and green light may be on starboard side that is right side of UAV. In an embodiment, UAV may include a built-in emergency position indicating radio beacon (EPIRB).

In an embodiment, UAV may automatically return to base unit when battery reserve capacity falls below a first threshold level. Base unit may be further configured to supply power to power source of UAV until battery reserve capacity exceeds a second threshold level.

In an embodiment, UAV may further comprise a control actuator, a motion sensor, an air speed sensor, a position sensor, and a flight controller. Flight controller may be configured to control in-flight operations of UAV and image sensor has visible light and infrared (IR) capturing capabilities. In an embodiment, in-flight operations may comprise one or more operations performed by a drive motor, propellers, and power source based on one or more sensors, when operating in autonomous mode. In another embodiment, a search operation may be controlled by a user, via a touch screen of a remote control unit. In an embodiment, remote control unit may be configured to provide one or more instructions to UAV. Remote control unit may comprise a video monitor.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in details of construction and combination of parts as will be more fully understood from following description, when read in conjunction with accompanying drawings in which.

DETAILED DESCRIPTION OF THE EMBODIMENTS OF THE INVENTION

Referring now to drawings, FIGS. 1-6, where present invention is generally referred to with numeral 12, it can be observed that a UAV, in accordance with one embodiment, is provided that includes various components, a described hereinafter.

Figure 1:
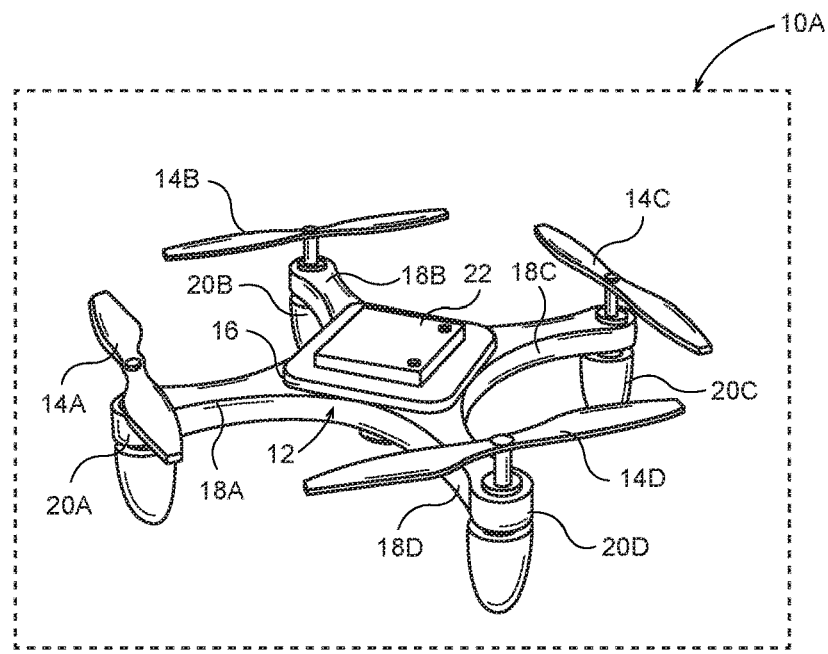
FIG. 1 represents a top view of UAV, according to an embodiment described herein.
Figure 2:
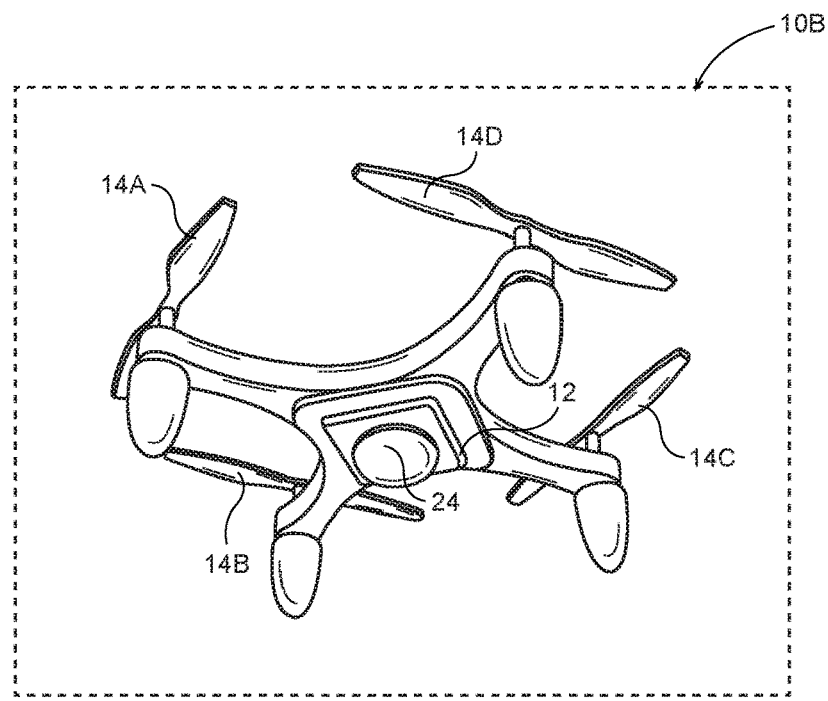
FIG. 2 represents a bottom view of UAV, according to an embodiment described herein.

FIG. 1 represents top view 10A of UAV 12 and FIG. 2 represents a bottom view 10B of UAV 12, according to an embodiment described herein.

As illustrated, UAV 12 may include four propellers 14A-14D, out of which two propellers, such as 14A and 14B, may pull UAV 12 through air, and other two propellers, such as 14C and 14D, may push UAV 12 forward during flight. From center body 16 of UAV 12, four arms 18A-18D are extended at end of which four motorized rotors 20A-20D are attached to provide lift to UAV 12. There are further provided four waterproofed float pads underside four motorized rotors 20A-20D.

UAV 12 may have a weather-resistant body having an upper half, as illustrated in top view 10A, and a lower half, as illustrated in bottom view 10B, molded from plastic and fastened together by use of various mechanical means, such as nuts and bolts and screws. Upper half, as illustrated in top view 10A, may include a cover member 22 that secures various electronics and houses colored LED indicators, which may indicate a state of UAV 12. For example, an activated red LED may indicate low battery level or standby status, and activated green LED may indicate sufficient battery level, ready status, or in-flight status of UAV 12. Lower half, as illustrated in bottom view 10B, may include a protruding dome-shaped member 24 that secures various critical electronics, as described in FIG. 3, and waterproofing electronic components and wired connections therein, either by being coated in plastic or by a water tray for diverting water away from electronics components.

Figure 3:
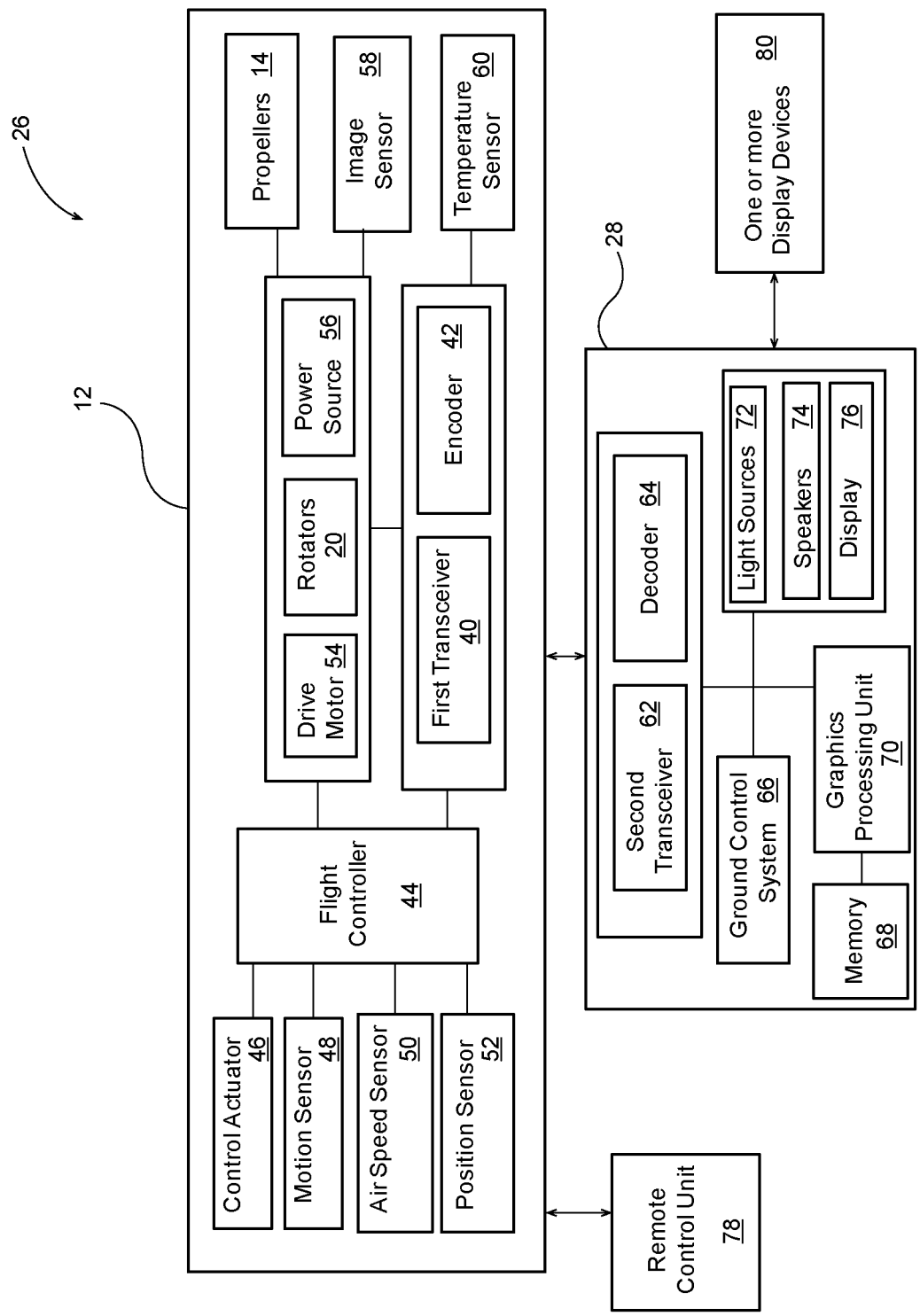
FIG. 3 represents a block diagram of UAV monitoring system, according to an embodiment described herein.

FIG. 3 represents a block diagram of UAV monitoring system 26, according to an embodiment described herein. UAV monitoring system 26 may comprise UAV 12, a base unit 28, a remote control unit 78, and one or more display devices 80. In addition to external components descried in FIGS. 1 and 2, UAV 12 further comprises first transceiver 40, encoder 42, flight controller 44, control actuator 46, motion sensor 48, air speed sensor 50, position sensor 52, drive motor 54, power source 56, image sensor 58 (such as a camera), and temperature sensor 60. UAV 12 may monitor a surface of a water body or terrain while hovering over water body or terrain.

Encoder 42, coupled with first transceiver 40, may be to receive a field-of-view (FOV) from image sensor 58 when one or more events are identified from a surface of water body. One or more events may correspond to presence of marine animals, presence of marine plants, or an environmental occurrence. In some examples, environmental occurrence may correspond to a temperature break, color change, a waypoint, or an atmospheric condition. Encoder 42 may further receive telemetry data from flight controller 44. Accordingly, encoder 42 may generate encoded FOV and first transceiver 40 may then transmit encoded FOV to base unit 28 through a communication network. Encoded FOV may be a live feed or one or more still photographs. In some embodiments, first transceiver 40 may also receive control instructions from base unit 28 and/or a remote control unit 78.

Flight controller 44, under control of flight control software, senses motion, air speed, and position from motion sensor 48, air speed sensor 50, and position sensor 52, respectively, and determines flight of UAV 12 using control actuators 18 on a desired trajectory. Thus, flight controller 44 may be configured to control in-flight operations of UAV 12. In-flight operations may comprise one or more operations performed by drive motor 54, propellers 14, and power source 56 based on one or more sensors, when operating in autonomous mode. In an embodiment, a user, via a touch screen of remote control unit 78, may control a search operation. Remote control unit 78 may be configured to provide one or more instructions to UAV 12 during flight. Remote control unit 78 may comprise a video monitor also apart from navigational control buttons.

Base unit 28 may be located at an elevated point and configured to dock UAV 12. Base unit 28 may comprise second transceiver 62, decoder 64, ground control system 66, memory 68, graphics processing unit 70, light sources 72, speakers 74, and display 76.

Second transceiver 62 may be coupled with decoder 64 to receive encoded FOV from first transceiver 40 through communication network. In some embodiments, graphics processing unit 70 may be configured to generate a three-dimensional rendering and virtual graphic animation based on decoded FOV. Ground control system 66 may communicate generated three-dimensional rendering and virtual graphic animation to one or more display devices 80 coupled to base unit 28. One or more display devices 80 may be associated with one or more users. In various embodiments, one or more display devices may correspond to a smart phone, a tablet, or a dedicated monitor. Further, ground control system 66 may include a user interface on display 76, which allows a user to identify one or more events and associated objects in displayed FOV, and also determine coordinates of displayed objects.

In an embodiment, UAV 12 may automatically return to base unit 28 when battery reserve capacity of power source 56 falls below a first threshold level. UAV 12 may dock on base unit 28 and automatically secured through magnetic locking system. Base unit 28 may supply power to power source 56 of UAV 12 until battery reserve capacity of power source 56 exceeds a second threshold level. Accordingly, magnetic locking system may unlock UAV 12 and release UAV 12 to continue its operations, such as monitoring and surveillance.

Figure 4:
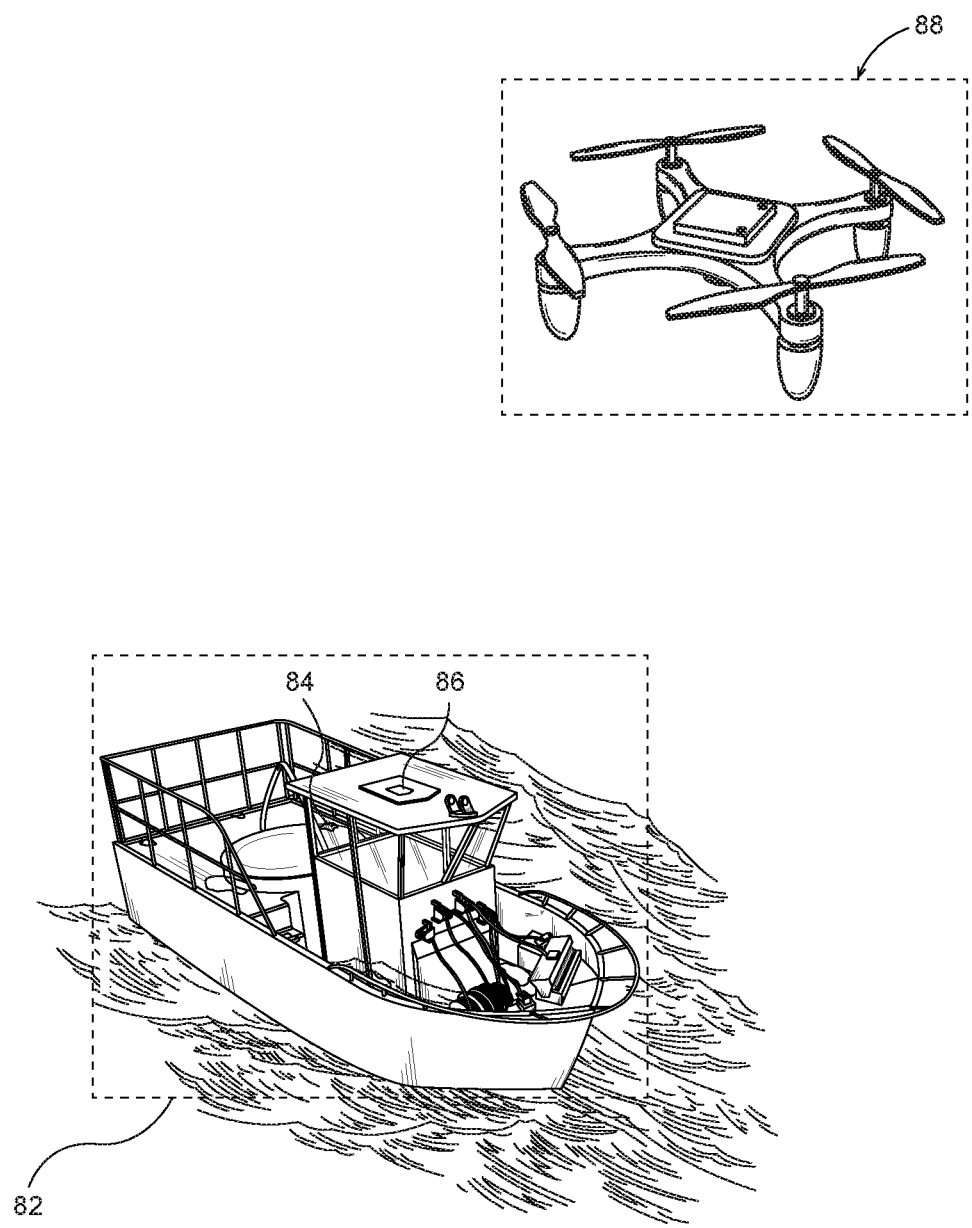
FIG. 4 represents a use case of UAV monitoring system, according to an embodiment described herein.

FIG. 4 represents a use case of UAV monitoring system 26, according to an embodiment described herein. Illustrated in FIG. 4 is a water vehicle, such as boat 82, having a docking station 86, similar to base unit 28 (FIG. 3), at an elevated point 84. Also shown is an aerial drone 88, similar to UAV 12 (FIG. 3).

Use case, as illustrated in FIG. 4, fulfills the need for outfitting of aerial drone 88 and remote control unit 78 for specialized use in various marine service applications. Aerial drone 88 may be used as a monitoring and communication device, fishing aid, marine navigation and survey device, and boating safety device. Docking station 86 may be equipped with a wireless location beacon, latch and batteries. Wireless remote control unit 78 includes video monitor and a camera with visible light and infrared (IR) capabilities. The unit may measure 14 to 24 inches high, long and wide.

User, such as a pilot may release the aerial drone 88 to collect and relay data on proximity of marine life to a smart phone, tablet or dedicated monitor. Aerial drone 88 may automatically return to docking station 86 at minimum safe battery reserve capacity. Aerial drone 88 may be adaptable for use in a marine environment with waterproofing features. In an embodiment, docking station 86 may be virtual invention presentation equipment enabled due to which generated video contains 3D renderings and computer generated animation.

The present disclosure imparts various benefits as described herein. For example, UAV monitoring system 26 enables fishermen to locate fish easily from boat 82 for a more productive day. UAV monitoring system 26 further provides surveillance of fishing areas for presence of fish or dolphin pods, kelp paddies and temperature breaks. UAV monitoring system 26 makes real-time data and photographs easily accessible to associated users. UAV monitoring system 26 is easy to install and operate, remains locked in position via magnetic locks, versatile for day or night use, durable, convenient, effective and affordably priced.

UAV monitoring system 26 finds its utility in various other applications also, such as sporting goods stores, discount department and variety stores, warehouse clubs and super stores, boat dealers, wholesalers of sporting goods, televised home shopping programs, websites, mail-order catalogs, boat shows, fishing shows, and the like.

Figure 5:
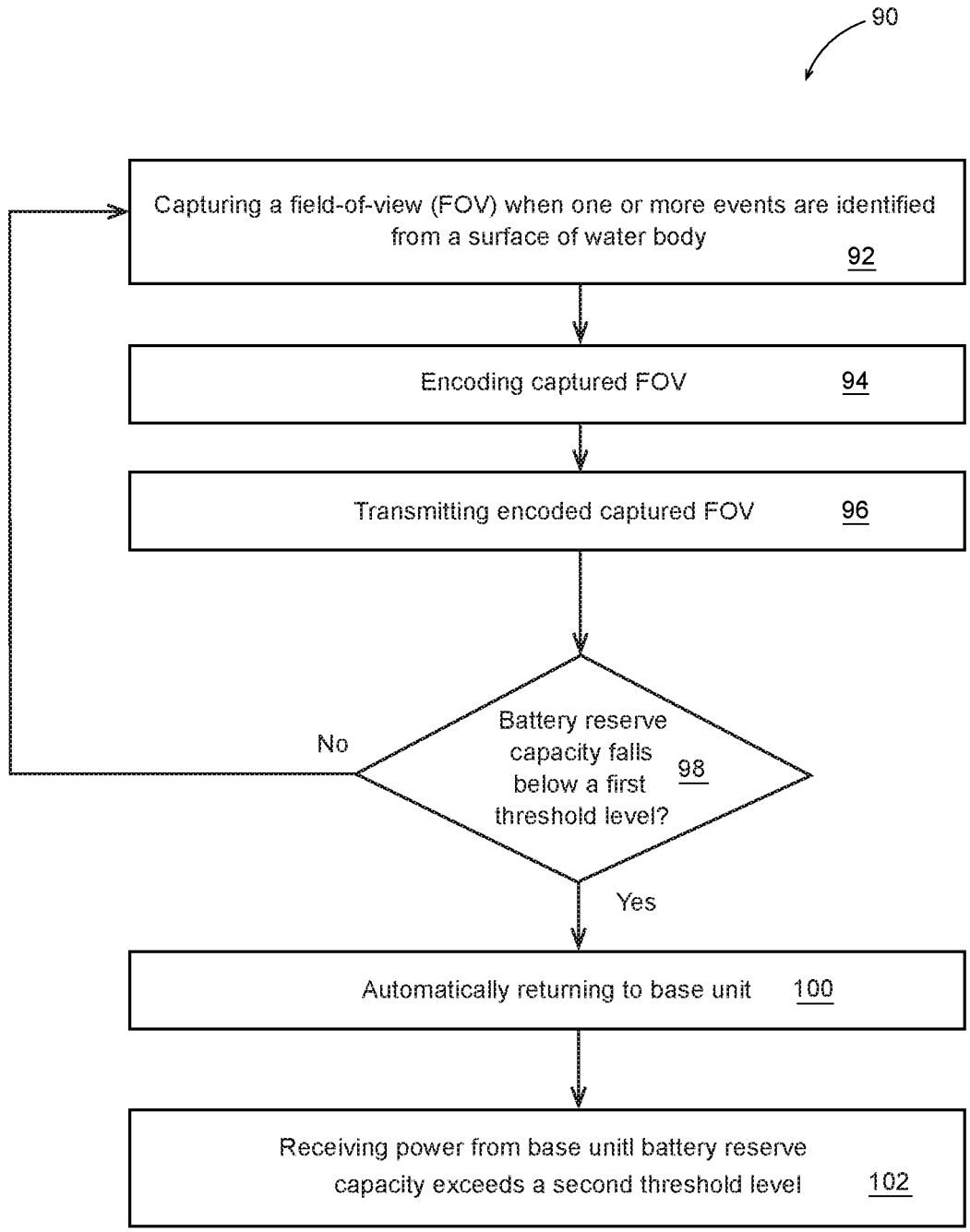
FIG. 5 represents a flowchart illustrating a method executed by UAV for UAV monitoring, according to an embodiment described herein.

FIG. 5 represents a flowchart 90 illustrating a method executed by UAV 12 (or aerial drone 88) for UAV monitoring, according to an embodiment described herein. At step 92, image sensor 58 may capture an FOV when one or more events are identified from a surface of water body. One or more events may correspond to presence of marine animals, presence of marine plants, or an environmental occurrence. In some examples, environmental occurrence may correspond to a temperature break, color change, a waypoint, or an atmospheric condition. At step 94, encoder 42, coupled with first transceiver 40, may receive FOV from image sensor 58 and generate an encoded FOV. Encoded FOV may be a live feed or one or more still photographs. At step 96, first transceiver 40 may transmit encoded FOV to second transceiver 62 of base unit 28 through communication network. At step 98, if battery reserve capacity falls below a first threshold level, control passes to step 100 else back to step 92. At step 100, UAV 12 automatically returns to base unit 28 under control of flight controller 44 when operating in autonomous mode. At step 102, UAV 12 (or aerial drone 88) may be magnetically secured to base unit 28 and may receive power from base unit 28 (or docking station 86) until battery reserve capacity exceeds a second threshold level.

Figure 6:
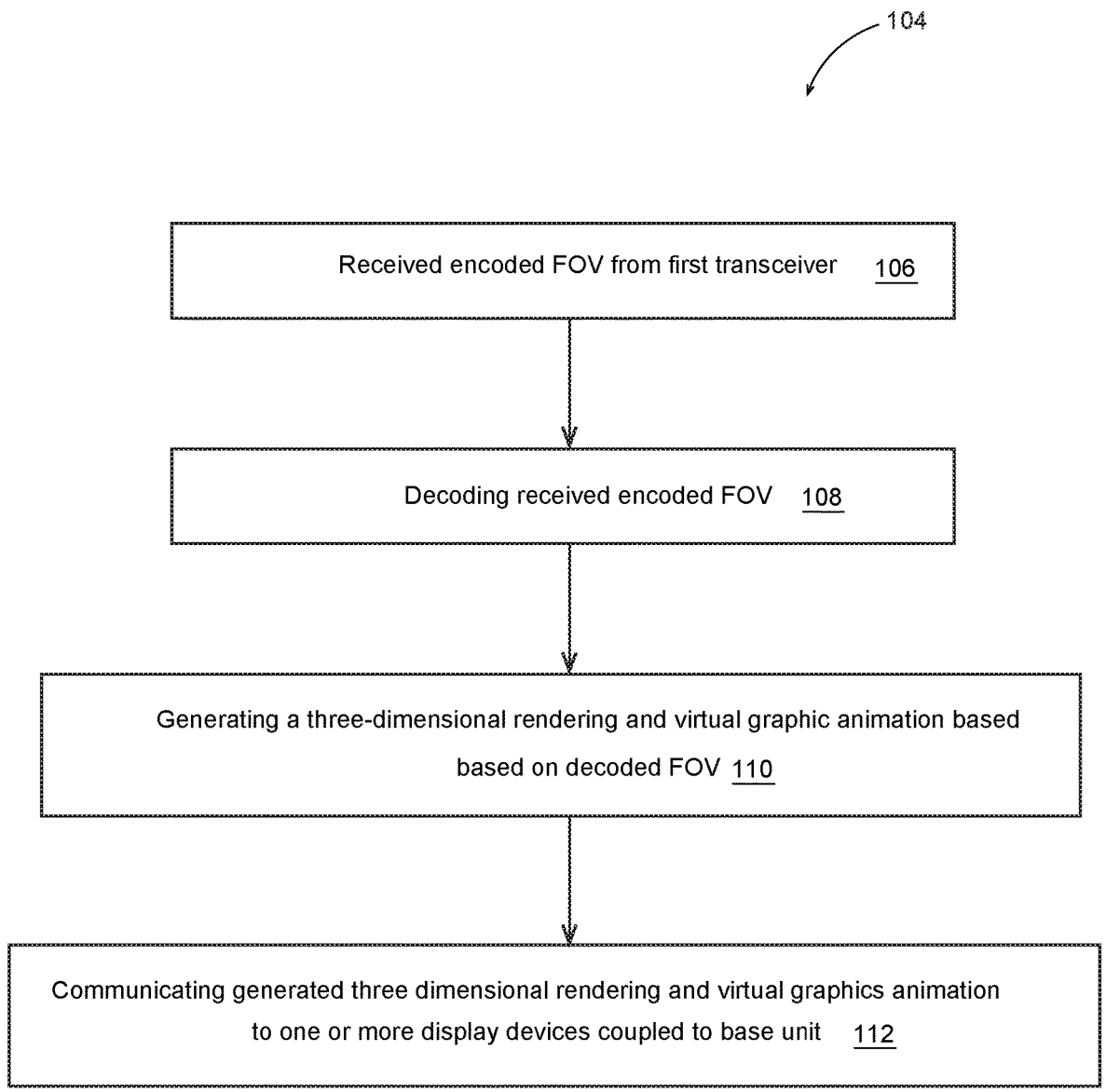
FIG. 6 represents another flowchart illustrating a method executed by base unit for UAV monitoring, according to an embodiment described herein.

FIG. 6 represents a flowchart 104 illustrating a method executed by base unit 28 (or docking station 86) for UAV monitoring, according to an embodiment described herein. At step 106, second transceiver 62 may receive encoded FOV from first transceiver 40 through a communication network. At step 108, decoder 64 may decode received encoded FOV. At step 110, graphics processing unit 70 may be configured to generate a three-dimensional rendering and virtual graphic animation based on decoded FOV. At step 112, ground control system 66 may communicate generated three-dimensional rendering and virtual graphic animation to one or more display devices 80 coupled to base unit 28. One or more display devices 80 may be associated with one or more users. In various embodiments, one or more display devices may correspond to a smart phone, a tablet, or a dedicated monitor.

One or more users may analyze three-dimensional rendering and virtual graphic animation for performing one or more operations in one or more application areas. As discussed above, various application areas may be sporting goods stores, discount department and variety stores, warehouse clubs and super stores, boat dealers, wholesalers of sporting goods, televised home shopping programs, websites, mail-order catalogs, boat shows, fishing shows, search and rescue and the like.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An unmanned aerial vehicle (UAV) monitoring system, comprising:
   a UAV configured to monitor a surface of a water body while hovering over said water body, said UAV comprising:
      an image sensor configured to capture a field-of-view (FOV) when one or more events are identified from a surface of said water body; and
      a first transceiver configured to transmit an encoded captured FOV; and
   a base unit located at an elevated point in a water vehicle and configured to dock said UAV, said base unit comprising:
      a second transceiver configured to receive said encoded FOV from said first transceiver;
      a decoder configured to decode said received encoded FOV; and
      a graphics processing unit configured to generate a three-dimensional rendering and virtual graphic animation based on said decoded FOV; and
      a ground control unit configured to communicate said generated three-dimensional rendering and virtual graphic animation to one or more display devices coupled to said base unit.

2. The UAV monitoring system of claim 1, wherein said UAV further comprises a control actuator, a motion sensor, an air speed sensor, and a position sensor, wherein said image sensor has visible light and infrared (IR) capturing capabilities.

3. The UAV monitoring system of claim 1, wherein said UAV further comprises a flight controller configured to control in-flight operations of said UAV.

4. The UAV monitoring system of claim 3, wherein said in-flight operations comprises one or more operations performed by a drive motor, propellers, and power source based on one or more sensors, when operating in autonomous mode.

5. The UAV monitoring system of claim 1, wherein a remote control unit is configured to provide one or more instructions to said UAV, wherein said remote control unit comprises a video monitor, wherein said video monitor has a touch screen, wherein one of said one or more instructions corresponds to a search operation controlled by a user.

6. The UAV monitoring system of claim 1, wherein said one or more events correspond to presence of marine animals, presence of marine plants, or an environmental occurrence, wherein said environmental occurrence corresponds to a temperature break, color change, a waypoint, or an atmospheric condition.

7. The UAV monitoring system of claim 1, wherein said one or more display devices are associated with one or more users, wherein said one or more users view said three-dimensional rendering and virtual graphic animation for monitoring said water surface, fishing aid, marine navigation and survey applications, and boating safety, wherein each of said one or more display devices corresponds to a smart phone, a tablet, or a dedicated monitor.

8. The UAV monitoring system of claim 1, wherein said encoded FOV is a live feed or one or more still photographs.

9. The UAV monitoring system of claim 1, wherein said UAV automatically returns to said base unit when battery reserve capacity falls below a first threshold level.

10. The UAV monitoring system of claim 9, wherein said base unit is further configured to supply power to power source of said UAV until said battery reserve capacity exceeds a second threshold level.

11. The UAV monitoring system of claim 1, wherein said UAV includes navigational lights comprising red light and green light, wherein said red light is on a port side that is left side of said UAV, wherein said green light is on starboard side that is right side of said UAV, wherein said UAV includes a built-in emergency position indicating radio beacon (EPIRB).

* * * * *